Feb. 18, 1947.  C. G. HEBEL  2,416,054
LIQUID CONTROL GEAR
Filed Sept. 20, 1945  2 Sheets-Sheet 1
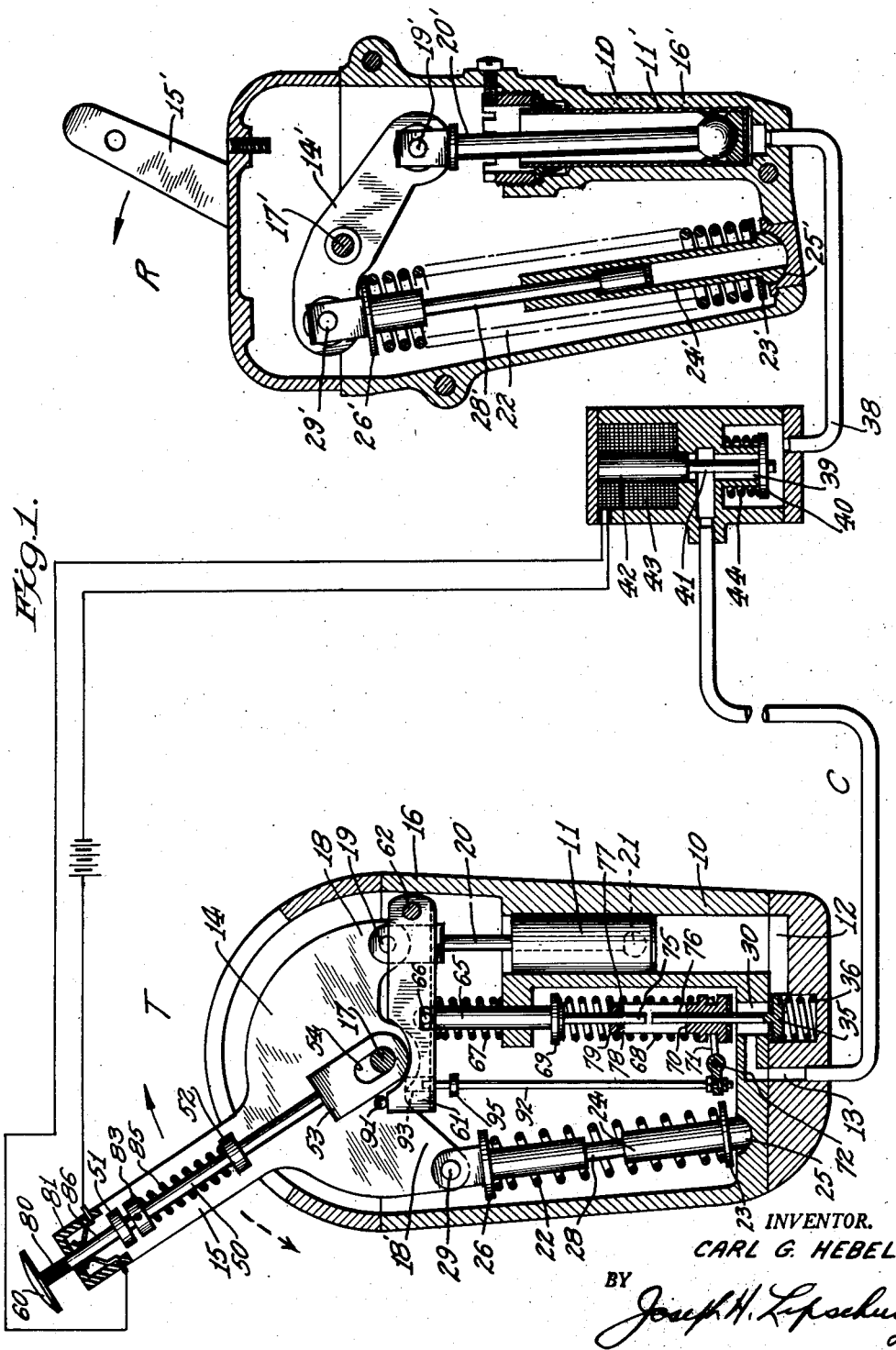
INVENTOR.
CARL G. HEBEL
BY
Joseph H. Lipschutz
ATTORNEY Feb. 18, 1947.  C. G. HEBEL  2,416,054
LIQUID CONTROL GEAR
Filed Sept. 20, 1945  2 Sheets-Sheet 2
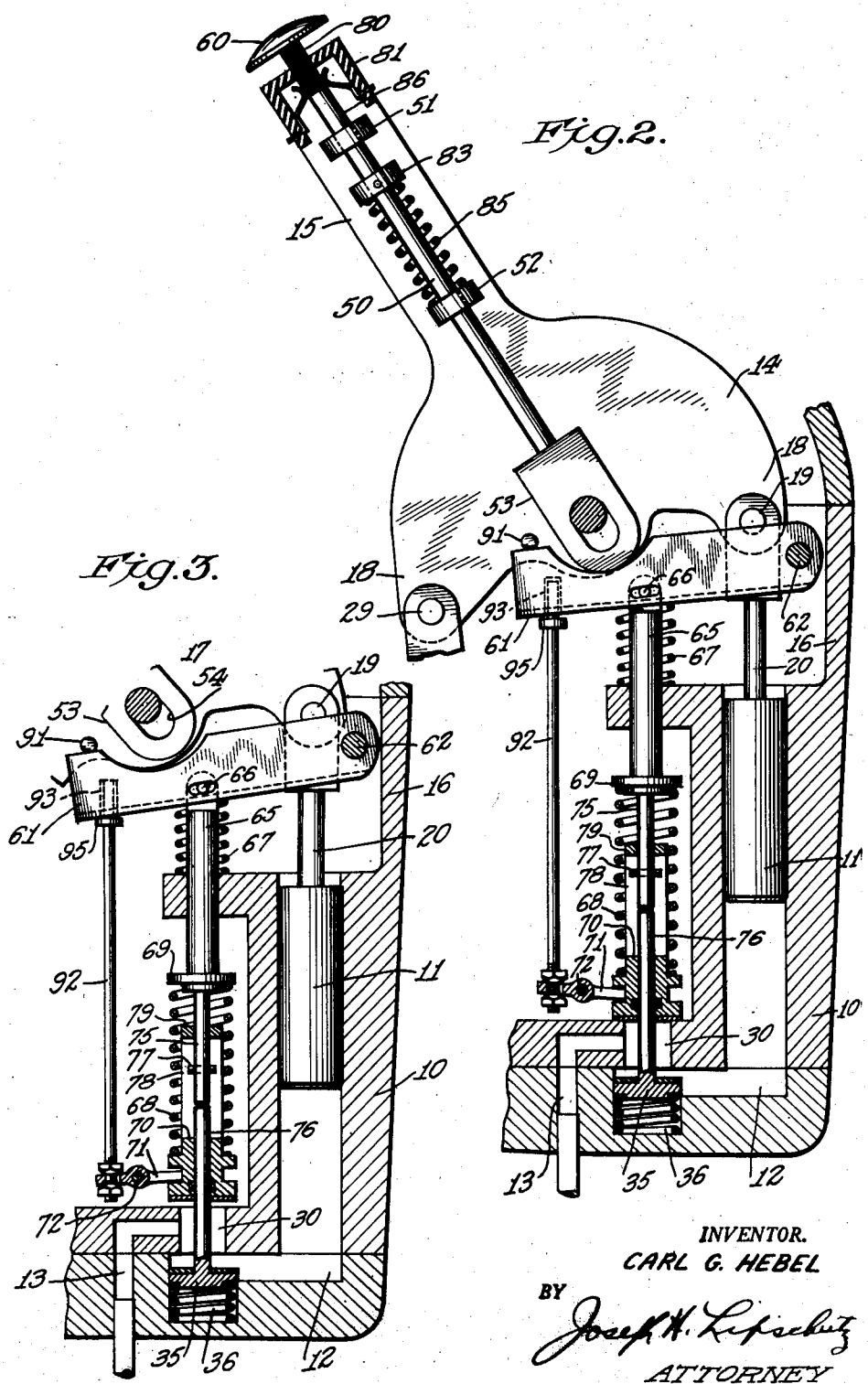
INVENTOR.
CARL G. HEBEL
BY
Joseph H. Lipschutz
ATTORNEY Patented Feb. 18, 1947

2,416,054

UNITED STATES PATENT OFFICE 2,416,054

LIQUID CONTROL GEAR

Carl G. Hebel, Leonia, N. J., assignor to Sperry Products, Inc., Hoboken, N. J., a corporation of New York Application September 20, 1945, Serial No. 617,479

10 Claims. (Cl. 60—54.5)

This invention relates to liquid control gear of the type wherein movement of a member at a transmitting station is caused to control movement of a member at a receiving station. More particularly this invention relates to control gear of this type wherein the transmitting and receiving stations are connected by a liquid transmission system. One such system is shown in the patent to H. S. Hele-Shaw and T. E. Beacham, No. 1,983,884, granted December 11, 1934, for hydraulic control gear, in which the object is to apply a constant force to the fluid system at the transmitting end and to receive a corresponding constant force at the receiving end. Another such system is shown in the patent to Alfred W. Lawrence, No. 2,197,554, granted April 16, 1940, for Liquid control gear, in which the object consists in applying a continuously increasing load at the operated and receiving ends. In either of the aforementioned cases the operating and operated members will retain any position into which they may be moved without any tendency on their part to return to a centralized position.

In this type of transmission system a problem arises due to the fact that the fluid in the transmission system changes its temperature, particularly at the receiving end due to the operation of the mechanism at that end, and such change is at a greater rate than that of the pipe in which the transmitting fluid is contained. As a result, the parts at the receiving end are operated through a predetermined degree greater, or less, than the operation which has been transmitted thereto at the transmitting end. Thus, for instance, it has been found in cases where the receiving end is employed to operate a variable pitch propeller mechanism under control of a governor that the temperature variation due to heating up of the fluid at the receiving end has caused variation in engine speed up to 200 R. P. M.

It is therefore one of the principal objects of this invention to provide a transmission system of the type described, wherein the relationship between the transmitter and the receiver will not be substantially affected by temperature variations in the transmitting fluid. For this purpose the transmitter and the receiver are normally locked against temperature variations in the transmission line which connects them. The transmission line is normally connected to a reservoir so that the liquid in the line is free to expand and contract, while at the same time the line is disconnected from the transmitter and the receiver. Only during operation of the transmission system is the line disconnected from the reservoir and connected to the transmitter and the receiver.

Thus another object of this invention is to provide novel means for accomplishing the above described operation wherein the transmission line is normally disconnected from the transmitter and receiver, but when it is desired to operate the system, the transmission line is disconnected from the reservoir and connected to the transmitter and the receiver.

Further objects and advantages of this invention will become apparent in the following detailed description thereof.

In the accompanying drawings,

Fig. 1 is an assembly view, with parts sectioned vertically, of liquid control gear embodying my invention.

Fig. 2 is an enlarged view of a portion of the transmitter in another operating position of the parts.

Fig. 3 is a view similar to Fig. 2 showing the parts in still another operating position.

Referring to the drawings, it will be seen that the invention comprises three main parts, namely, a transmitting station T, a receiving station R, and a force transferring connection or duct C. Duct C is filled with fluid in a column which extends from a transmitter piston 11 to a receiver piston 11'. For applying force to the liquid column for the purpose of transmitting force, there may be provided within the transmitter T a cylinder 10 within which operates the piston 11. The cylinder is connected at one end to the duct C through passages 12 and 13 within the transmitter casing 16. For operating the piston in a direction to transmit force to the liquid column there may be provided a transmitting element in the form of a lever 14 pivoted within the casing 16 on a pivot 17 and having an operating handle 15 and the lever or crank arms 18 and 18'. The pivot 17 is supported at its ends in the casing in suitable bearings. The crank arm portion 18 is pivotally connected at 19 to the upper end of a piston rod 20 pivotally connected to the piston at 21. As the handle is moved in the direction of the arrow, the piston is lowered to cause the column of liquid to move through the duct C. The force which is applied to the piston is determined by one or more loading springs 22, seated at one end against the bracket 23, fixed upon the sleeve 24, pivoted at 25. The other end of the loading spring bears against the bracket 26 fixed to a rod 28, which operates within the sleeve member 24. The spring is under compression and applies the loading force to the lever arm 18' by way of the pivotal connection 29 between the upper end of rod 28 and the operating lever 14. The distance between the center of pivot 17 and the center of pivot 29 forms the crank arm 18 through which the force is applied. The positions of the spring and its connections are such that the spring acts through a small lever arm to apply a relatively light loading force to crank arm 18 and the piston 11 when the piston is in its uppermost position, but as the handle 15 is actuated in the direction of the arrow it will be seen that the spring acts through an increasing lever arm. At the same time, however, the spring is extended, so that while it acts through a larger lever arm it applies a decreasing force to said arm as the latter increases. The design of the various parts may be made such that the rate of decrease of the compressive force of the spring is equal to, greater than, or slower than the rate of increase of the lever arm as handle 15 is actuated in the direction of the arrow, depending upon the purpose to which the device is to be put, that is, whether the product of these two factors is to be substantially constant to yield a substantially constant loading force, or whether said product is to yield a continuously increasing or decreasing loading force.

The operation of handle 15 at the transmitting station just described to move piston 11 inwardly in its cylinder will cause piston 11' at the receiving end to be moved outwardly in its cylinder and cause a piston rod 20', connected to said piston, to actuate a lever 14' pivoted at 17'. The piston rod 20' is pivotally connected to one end of lever 14' at 19' and said lever 14' is pivotally connected at its other end at 29' to a two-part extensible member 24'—28' pivoted at its other end at 25' in the casing 16', the said two-part element 24'—28' being similar to the element 24—28, at the transmitting end. The two parts similarly hold between brackets 23' and 26' one or more compression springs 22' similar to spring 22. The distances between pivot 17' and pivot 19' and between 17' and 29' are the same as between pivot 17 and pivots 19 and 29. That is, it will be seen that the relationship of parts at the transmitter and the receiver are the same but in inverse order and therefore a force transmitted by movement of piston 11 will produce an equal movement of piston 11'.

The interior of the casing 16 is in the form of a reservoir. The duct C is normally connected to said reservoir by way of passage 13 and a port 30 leading from the interior of casing 16 to the passage 12 in communication with the interior of cylinder 10. Cylinder 10 and passage 12 are normally shut off from port 30 and the interior of casing 16 by means of a valve 35 normally held against its seat by a spring 36. The transmitting end of duct C is thus normally in connection with the reservoir within casing 16 by way of port 30 and passage 13.

At its other end the duct C communicates with the cylinder 10' within casing 16' by way of a duct 38 in communication with a valve chamber V within which is a passage 39 in communication with duct C. Duct C is normally disconnected from duct 38 and therefore from the receiver cylinder 10' by reason of valve 40 normally closing the passage 39. This is effected by a valve stem 41 fixed to valve 40 and carrying at its outer end a core 42 operating in a normally energized solenoid 43. This energization lifts the valve against the action of a spring 44 to maintain the valve normally closed. The duct C is therefore normally disconnected at its ends from connection with cylinders 10 and 10' but it is in communication with the reservoir from within casing 16. The duct 38 is made as short as possible by placing the valve V as close to the reservoir as possible. In this manner there is very little fluid contained between valve V and piston 11' and between valve 35 and piston 11, so that temperature changes acting upon these small quantities of fluid will not materially displace the pistons, while the main body of fluid connected in duct C is free to expand and contract without having any effect upon the pistons 11 and 11'.

From the above description it is apparent that normally the duct C is disconnected from the transmitter and receiver pistons, but is connected to the reservoir within the transmitter. However, when it is desired to transmit a force from the transmitter to the receiver, it is necessary to reverse this condition and to disconnect the duct from the reservior and connect the duct to the pistons 11 and 11'. For this purpose there is provided the following means for disconnecting the transmitter end of duct C from the reservoir and connecting it to cylinder 10 and piston 11. The transmitter handle 15 is provided with a rod 50 slidable within brackets 51 and 52 fixed to the handle and carrying at its lower end a member 53 having a slot 54 through which extends pivot 17 to permit the rod 50 to move up and down along handle 15 relative to fixed pivot 17. Upon pressing a button 60, carried at the upper end of rod 50, the lower end of member 53 will engage and press downwardly a link 61 pivoted in the casing 16 at 62. Such downward movement of link 61 will cause downward movement of link 65 pivoted upon link 61 at 66 against the action of a spring 67 to cause compression of a spring 68 contained between a bracket 69 fixed to the link 65 and an upper valve member 70 carried by a lever 71, pivoted in the casing 16 at 72. The downward movement of button 60, link 50, link 61 and link 65 will compress spring 68 sufficiently to cause valve member 70 to seat on the upper end of port 30 and cut off the connection between the reservoir and the duct C. This is the first step in the sequence to render the transmission system effective.

Further downward movement of links 60, 61 and 65 will cause a rod 75 carried by link 65 to engage a rod 76, carried by valve 35 and slidable through valve member 70, to depress valve 35 against the action of spring 36 and thus establish connection between cylinder 10 and duct C through passage 12, port 30 and passage 13. Rod 75 may have a pin 77 fixed thereto operating in a slot 78 formed in extension 79 on member 70. The pin is necessary to lift the valve off port 30 when button 60 is released. The second step in the sequence of rendering the transmission system effective has now been completed. A slight further downward movement of link 50 will cause the insulation segment 80 on the link 50 to engage contact brushes 81 and thus break the circuit through solenoid 43 which permits spring 44 to unseat valve 40 and thus establish communication between the receiver end of duct C and the cylinder 10', through passage 39, valve chamber V and duct 38.

A stop 83 carried by the link 50 will engage bracket 51 to prevent further downward movement of link 50 when the three steps in the above described sequence have been completed.

The transmitter handle 15 may now be operated around its pivot 17 while the operator holds button 60 in depressed position and such angular movement of handle 15 will cause corresponding angular motion of operated member 15'. When the desired motion has been transmitted and the handle 15 and operated member 15' have reached the desired positions, the operator merely removes pressure from button 60. This permits spring 85, compressed between bracket 82 on handle 15 and bracket 83 fixed on link 50, to raise link 50 and thus cause insulation segment 80 to move out of engagement with contacts 81 which then re-engage conductor segment 86 to establish the circuit through solenoid 43 which attracts core 42 and closes valve 40 against the action of spring 44. This cuts off the receiver end of duct C from the receiver cylinder 10'. Further upward movement of link 50 permits spring 36 to move valve 35 into closed position, and thus cut off transmitter cylinder 10 from the transmitter end of the duct C. Still further upward movement of link 50 will permit spring 67 to lift link 61 and link 65 which lifts pin 77 against the upper end of slot 78 in extension 79 of member 70 to lift member 70 which places the port 30 in communication with the reservoir in casing 16. The elongated slot 54 limits the upward and downward movements of link 50.

In case there has been leakage in the system which has caused handles 15 and 15' to move out of synchronism, such synchronism may be reestablished by moving handle 15 in the direction of the dotted arrow when the link 50 is in its raised position as shown in Fig. 1. Such movement will cause a pin 91 to engage link 61 and depress the same, causing downward movement of link 65 and eventually downward movement of rod 76 and valve 35. Such movement however, tends to depress member 70 to close port 30. In order to keep port 30 open, the following mechanism is provided. The normal amount of downward movement of link 61 has no effect upon a rod 92 which operates within an opening 93; but further than normal movement, such as is effected when the handle is moved in the direction of the dotted arrow causes the stop 95 on rod 92 to reach the lower side of link 61', and thereafter movement of link 61 will depress rod 92 to lift member 70 against the action of spring 68 which has been compressed by the downward movement of link 61 (see Fig. 3). Thus the cylinder 10 is brought into communication with the reservoir and compensation made for any deficiency or surplus of liquid.

The foregoing description of the invention is merely illustrative and changes may be made within the scope of the appended claims.

Having described my invention, what I claim and desire to secure by Letters Patent is:

1. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, valve means for normally disconnecting the duct from the cylinders and connecting it to the reservoir whereby the operating member is rendered ineffective, and actuating means adapted to be operated before the operating member is operated for operating the valve means for disconnecting the duct from the reservoir and connecting the duct to the transmitter and receiver cylinders to render the operating member effective.

2. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, valve means including electrically operated means for normally disconnecting the duct from the cylinders and connecting it to the reservoir whereby the operating member is rendered ineffective, and actuating means adapted to be operated before the operating member is operated for operating the valve means for disconnecting the duct from the reservoir and connecting the duct to the transmitter and receiver cylinders to render the operating member effective.

3. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including a mechanically operated valve between the duct and one cylinder and an electrically operated valve between the duct and the other cylinder for normally disconnecting the duct from the cylinders and connecting it to the reservoir to render the operating member ineffective, and actuating means adapted to be operated before the operating member is operated for actuating both valves to disconnect the duct.

4. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including a mechanically operated valve between the duct and the transmitter cylinder and an electrically operated valve between the duct and the receiver cylinder for normally disconnecting the duct from the cylinders and connecting it to the reservoir to render the operating member ineffective, and actuating means adapted to be operated before the operating member is operated for actuating both valves to disconnect the duct.

5. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, and actuating means adapted to be operated before the operating member is operated for actuating the valves at the transmitter and the valve at the receiver to disconnect the duct from the reservoir and connect the duct to the transmitter and receiver cylinders to render the operating member effective.

6. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, and a linearly movable member adapted to be operated before the operating member is operated for actuating the valves at the transmitter and the valve at the receiver to disconnect the duct from the reservoir and connect the duct to the transmitter and receiver cylinders to render the operating member effective.

7. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, and a linearly movable member carried by the operating member and adapted to be operated before the operating member is operated for actuating the valves at the transmitter and the valve at the receiver to disconnect the duct from the reservoir and connect the duct to the transmitter and receiver cylinders to render the operating member effective.

8. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, a linearly movable member, means responsive to the actuation of the linearly movable member to a predetermined degree for actuating one of the valves at the transmitter to disconnect the duct from the reservoir, means responsive to the further actuation of the linearly movable member for actuating the other valve at the transmitter to connect the duct to the transmitter cylinder, and means responsive to the further actuation of the linearly movable member for actuating the electrically operated valve to connect the duct to the receiver cylinder, whereby the operating member is rendered effective.

9. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, a linearly movable member carried by the operating member, means responsive to the actuation of the linearly movable member to a predetermined degree for actuating one of the valves at the transmitter to disconnect the duct from the reservoir, means responsive to the further actuation of the linearly movable member for actuating the other valve at the transmitter to connect the duct to the transmitter cylinder, and means responsive to the further actuation of the linearly movable member for actuating the electrically operated valve to connect the duct to the receiver cylinder, whereby the operating member is rendered effective.

10. In a hydraulic remote control system, in combination, a transmitter including a reservoir, a cylinder, a piston in the cylinder and an operating member for actuating the piston, a receiver including a cylinder, a piston in the cylinder and a member operated by the piston, a hydraulic force transferring duct between the cylinders, means including an electrically operated valve between the duct and the receiver cylinder and a pair of mechanically operated valves between the duct and the transmitter cylinder and between the duct and the reservoir for normally disconnecting the duct from the cylinders and connecting it to the reservoir to render the operating member ineffective, one of the valves at the transmitter being normally open and the other valve being normally closed, and means responsive to the actuation of the operating member in a given direction to a predetermined degree for opening the normally closed valve to connect the transmitter cylinder to the reservoir and the duct for synchronization.

CARL G. HEBEL.

REFERENCES CITED

The following references are of record in the file of this patent:

UNITED STATES PATENTS

| Number | Name | Date |
|---|---|---|
| 1,570,097 | Sumner | Jan. 19, 1926 |
| 2,287,960 | Ballard | June 30, 1942 |
| 2,383,180 | Ellinwood | Aug. 21, 1945 |